Figure 4:
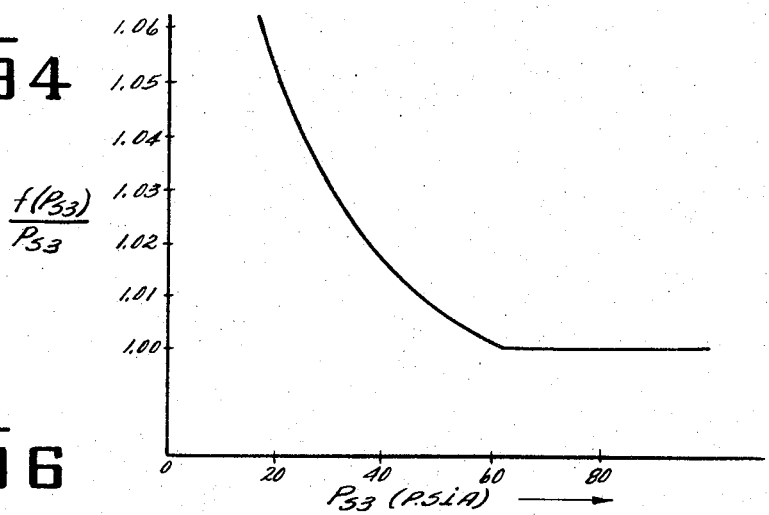

April 16, 1968        I. E. MARVIN        3,377,848
TEMPERATURE INDICATING MEANS FOR GAS TURBINE ENGINES
Filed Aug. 22, 1966        2 Sheets-Sheet 1
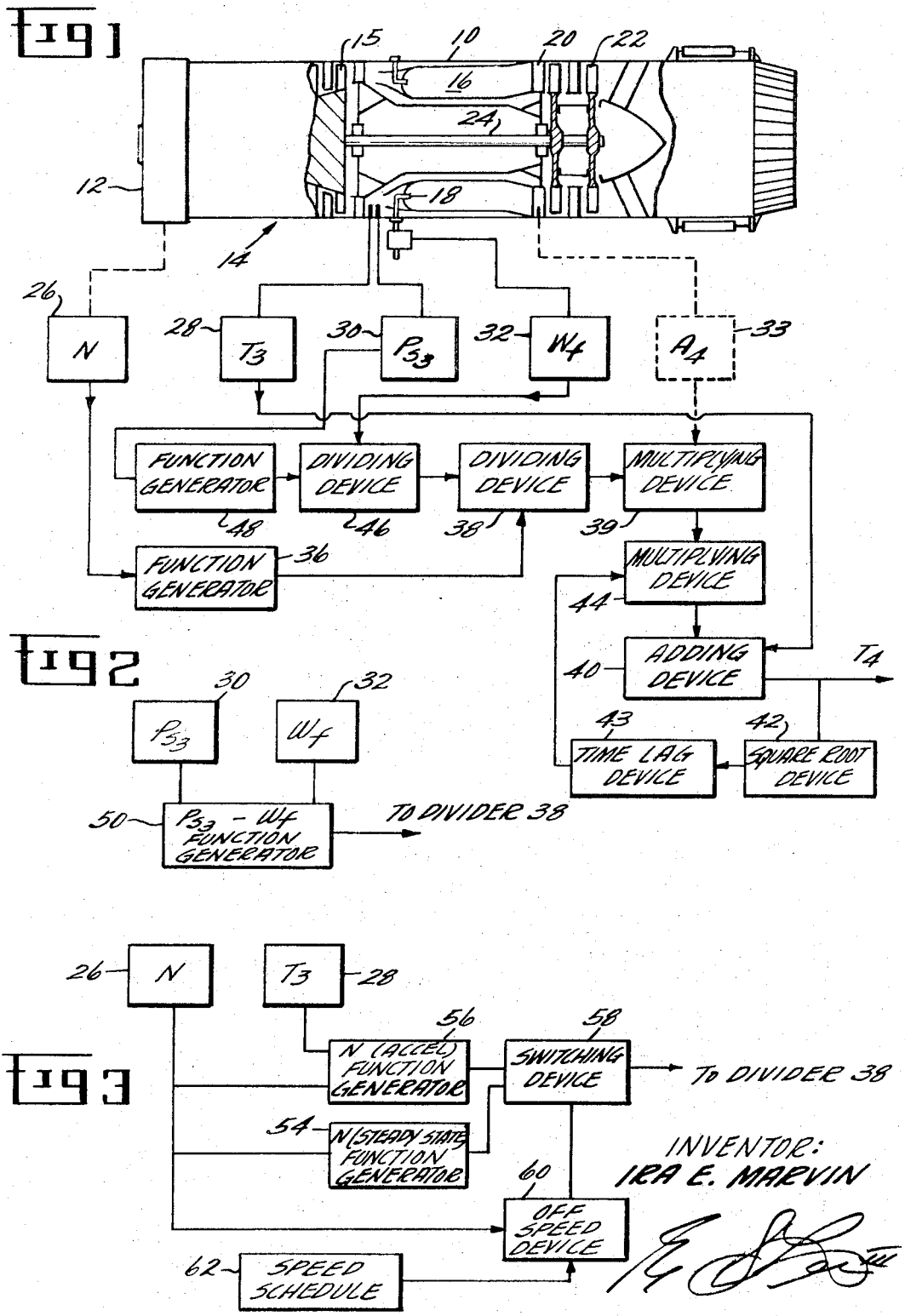
INVENTOR:
IRA E. MARVIN
ATTORNEY

INVENTOR:
IRA E. MARVIN

ATTORNEY

United States Patent Office 3,377,848
Patented Apr. 16, 1968

3,377,848
TEMPERATURE INDICATING MEANS FOR GAS TURBINE ENGINES
Ira E. Marvin, Fairfield, Ohio, assignor to General Electric Company, a corporation of New York
Filed Aug. 22, 1966, Ser. No. 574,140
9 Claims. (Cl. 73—117.3)

The present invention is directed to temperature indicating means and more particularly to temperature indicating means for use with a gas turbine engine.

One of the most critical parameters in the control and operation of gas turbine engines is the temperature of the combustion gases at the turbine section inlet of the engine. As this temperature is increased, the efficiency of the engine increases. However, the materials used for the blading in the turbine section impose a limit on the turbine inlet temperatures due to their structural limitations at elevated temperatures.

It is a common object in high performance gas turbine engines to control this temperature at the highest level commensurate with the high temperature capabilities of the turbine section blading to achieve maximum engine performance with maximum turbine section life.

With the advent of improved alloys used for turbine section blading, turbine inlet temperatures have been increased to the point where direct measurement of this parameter for control purposes is beyond the capabilities of present temperature sensors. In the past, indirect measurement of this parameter has been accomplished by indicators which correlate other engine operating parameters to give a turbine inlet temperature signal.

This approach, while generally effective in indicating moderate turbine inlet temperatures, lacks the accuracy necessary to indicate turbine inlet temperatures over a broad range of engine operating conditions.

Accordingly, it is an object of the present invention to accurately indicate the turbine inlet temperature of a gas turbine engine over a broad range of operating conditions by utilizing easily measured engine operating parameters.

The above ends are achieved in a gas turbine engine comprising a compressor for pressurizing air, the compressor having a compressor rotor and a combustor to which the pressurized air is delivered to support combustion therein. Means are provided for delivering fuel to the combustor for combustion with the air to generate a hot gas stream. A turbine comprising a rotor and an inlet for directing the hot gas stream to drive the rotor is provided and the rotors of the compressor and turbine are connected to form an engine rotor. Means for indicating the temperature at the inlet of the turbine are provided, indicating means comprising means for producing signals respectively proportional to engine rotor speed, combustor inlet air temperature, combustor inlet static pressure, and rate of fuel flow to the combustor. Means receiving the output from said signal producing means are provided for generating an intermediate signal as a function of the fuel flow divided by the turbine inlet area and the combustor inlet static pressure and as a predetermined function of engine rotor speed and of the combustor inlet static pressure. Means are provided for adding the output signal from said temperature signal means to the output of said intermediate signal generating means. Means are provided for deriving from the output signal of said adding means a signal representative of the square root thereof and multiplying the output from said intermediate signal generating means by the square root signal, whereby the indicating means produces an output signal from the adding means accurately representing the temperature at the inlet to the turbine.

The above and other related objects and features of the present invention will be apparent from a reading of the following description of the disclosure found in the accompanying drawing and the novelty thereof pointed out in the appended claims.

Figure 6:
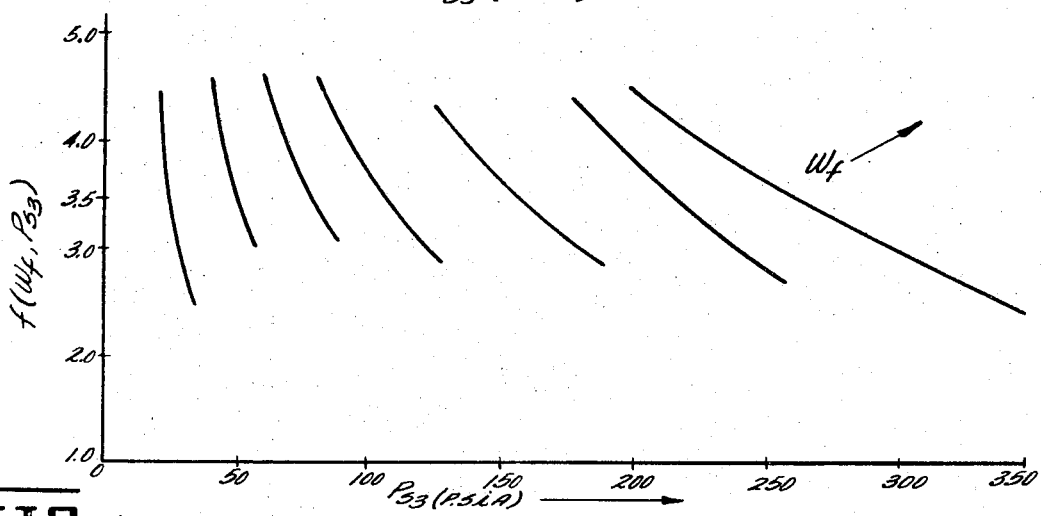
Figure 5:
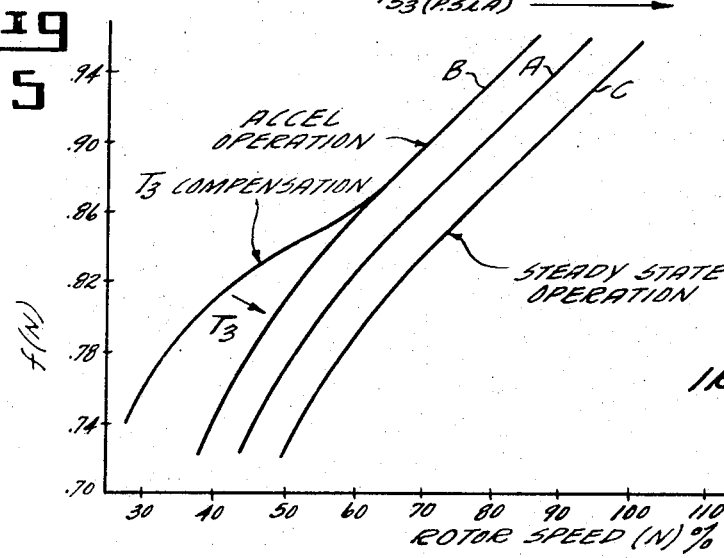

In the drawings:

FIGURE 1 is a diagrammatic showing of a gas turbine engine with a temperature indicating means in which the present invention is embodied;

FIGURES 2 and 3 are diagrammatic presentations of alternate embodiments of the temperature indicating means of FIGURE 1; and FIGURES 4, 5, and 6 illustrate intermediate signals generated by portions of the temperature indicating means of FIGURE 1 and FIGURES 2 and 3.

FIGURE 1 shows in simplified fashion a gas turbine engine 10 in which the present invention is used. The gas turbine engine 10 has an inlet 12 for entry of air into an axial flow compressor 14 having a compressor rotor 15 which pressurizes the air for discharge to a combustor 16. A series of nozzles 18 receive pressurized fuel from a suitable source for injection into the combustor 16. The resultant fuel-air mixture is ignited by well known means.

The exhaust gases pass through a turbine inlet 20 having a series of converging flow passages for accelerating the gases to a relatively high velocity. The turbine inlet 20 directs against a turbine rotor 22. The turbine rotor 22 is urged into rotation by the high velocity stream, which rotation is used to drive the compressor rotor 15 by means of an engine rotor 24.

In accordance with the present invention, the gas turbine engine is provided with a system for indicating the gas temperature $T_4$ at the turbine inlet 20 by utilizing easily sensed engine operating parameters.

The relationship between these various parameters is expressed as:

Equation 1

$$C_p W_{air}(T_4 - T_3) = (Q_h \eta_{CB} - N_{B4}) W_f$$

where:

$C_p$ = the specific heat of air at a constant pressure;
$W_{air}$ = the weight flow of air through the combustor 16;
$T_4$ = total or stagnation temperature of the gases at the turbine inlet 20;
$T_3$ = the total or stagnation temperature of the air at the inlet to the combustor 16;
$Q_h$ = the fuel heating value (Bt.u./lb. of fuel);
$\eta_{CB}$ = efficiency of combustion of the combustor 16;
$N_{B4}$ = the combustion function, or, in other words, the enthalpy change for fuel in the combustor; and
$W_f$ = the weight flow of fuel into the combustor through nozzles 18.

It may therefore be seen that the heat added to the air passing through the combustor 16 is equal to the heat given off by the fuel during the process of combustion. Rearranging Equation 1 to solve for $T_4$ or the temperature at the turbine inlet 20 gives:

Equation 2

$$T_4 = T_3 + \frac{W_f}{W_{air} C_p}(Q_h \eta_{CB} - N_{B4})$$

Thus, it is apparent that the turbine inlet temperature, or $T_4$, is equal to the inlet temperature of the combustor plus the fuel air ratio in the combustor over the specific heat of the air times the combustor efficiencies.

The air flow ($W_{air}$) may be measured with significant accuracy by measuring the gas flow through the turbine inlet 20. To measure the flow through the inlet, the following equation, commonly applied to turbine inlets, is used:

Equation 3

$$F_f = \frac{W_4\sqrt{T_4}}{P_4 A_4}$$

where $F_f$=flow function coefficient;
$W_4$=the weight flow of gases through the inlet 20;
$T_4$=the total temperature of the gases at the inlet 20;
$P_4$=the total pressure of the gases at the inlet 20; and
$A_4$=the flow area of the turbine inlet 20.

Rearranging Equation 3 gives:

Equation 4

$$W_4 = F_f \frac{P_4 A_4}{\sqrt{T_4}}$$

This equation shows that the weight flow of gases through the turbine nozzle is directly proportional to the flow function ($F_f$) coefficient, $P_4$, $A_4$, and inversely proportional to the square root of $T_4$.

The pressure $P_4$ is inconvenient to measure directly because of the high temperature environment. $P_4$ may be expressed indirectly in terms of the static pressure at the inlet to combustor 16 or $P_{s3}$ times a function of rotor speed $f(N)$. In a similar fashion $W_4$ may be expressed as $W_{air}$ times a function of rotor speed $f(N)$.

Hithertofore the flow function coefficient ($F_f$) has been throught to depend upon a multitude of independent variables and incapable of a simple relationship to a single parameter. However, it has been discovered that for assembled gas turbine engines this coefficient is primarily dependent upon a function of the rotor speed (N). This discovery has enabled the use of the flow function coefficient to measure the air flow ($W_{air}$) with a high degree of accuracy.

It has further been discovered that there are separate, functional relationships between $F_f$ and N, one for steady state operation of the engine 10, and the other for operation in an acceleration mode. Within these two modes, at relatively low power levels, the flow function equation is also related to the combustor inlet temperature $T_3$. The effect of $T_3$ on the flow function during these various modes is relatively small and may either be taken into account in the indication of the turbine inlet temperature to provide increased accuracy, or disregarded to achieve simplicity, as will be shown later.

In view of the foregoing considerations, Equation 4 can be modified and the air flow ($W_{air}$) into the combustor 16 may be represented as:

Equation 5

$$W_{air} = \frac{P_{s3} A_4 [f(N)]}{\sqrt{T_4}}$$

For ease in mechanization, all equation parameters having a functional relationship to rotor speed have been combined into one term $f(N)$. Furthermore, the effect of $T_3$ on the flow function has been disregarded until later in the discussion for ease in deriving the turbine inlet temperature $T_4$.

Substituting Equation 5 in Equation 2 gives:

Equation 6

$$T_4 = T_3 + \frac{W_f \sqrt{T_4}}{P_{s3} A_4 [f(N)] C_p}(Q\eta_{CB} - N_{B4})$$

The term $C_p$ may be expressed as a function of rotor speed $f(N)$. The coefficient $N_{B4}$ is relatively small in comparison to the term $Q\eta_{CB}$, and its minor effect may be expressed as a function of speed (N).

The fuel heating value (Q) is substantially constant and may be represented by a constant $K_0$. The efficiency of combustion ($\eta_{CB}$) for the combustor may be expressed as a constant ($K_1$) times a primary function of the static pressure ($P_{s3}$) at the inlet to the combustor 16 and as a minor function of the fuel air ratio ($W_f/W_{air}$). The effect of the fuel air ratio on the efficiency of combustion ($\eta_{CB}$) may be disregarded, as will later be shown for simplification of the computer system used to express $T_4$.

In view of the foregoing, Equation 6 may be presented as:

Equation 7

$$T_4 = T_3 + \frac{W_f \sqrt{T_4} K [f(P_{s3})]}{A_4 P_{s3}[f(N)]}$$

where the constants for the efficiency of combustion $K_1$ and the fuel heating value $K_0$ have been combined into one constant K.

Applying the above equation to a temperature indicating system for the engine of FIGURE 1, it may be seen that a speed sensing device 26 is mechanically connected to the rotor 24 of the gas turbine engine and produces a voltage signal directly proportional to the rotor speed (N). A temperature sensor 28 is adapted to produce a voltage signal directly proportional to the total temperature ($T_3$) in the combustor 16. A pressure sensor 30 is adapted to produce a voltage signal directly proportional to the static pressure ($P_{s3}$) in the combustor 16. A flow meter 32, preferably of the mass flow meter type to insure a high degree of accuracy, is adapted to produce a voltage signal dierctly proportional to the flow of fuel ($W_f$) injected into the combustor 16 through the nozzles 18. These sensing devices are adapted to produce voltage signals equally proportional to the parameters sensed so that the sensing devices are compatible with one another to provide inputs to the following intermediate signal producing system.

While the intermediate signal producing system will be described in terms of electrical components, it is to be understood that use of mechanical, electro-mechanical, pneumatic devices and the like may be used to perform the same functions as the electrical components.

The intermediate signal producing system comprises a voltage function generator 48 connected to the output of the pressure sensor 30. The function generator 48 is adapted to produce an output voltage that is a predetermined function of the input voltage. Many electrical circuits may be used for this purpose, including a servo multiplier, as shown in a Control Engineering Manual, by Ledgewood, McGraw-Hill, 1957, p. 132. Such a device may be adapted to produce an output voltage similar to that shown in FIGURE 4 which provides a compensation for the combustor efficiency $\eta_{CB}$.

The output of the fuel flow sensor 32 is fed to a dividing device 46 which may also be in the form of a servo multiplier as discussed on p. 129 of the Control Engineering Manual.

The output from the function generator 48 is fed to the dividing device 46 for the purpose of dividing the output voltage of the fuel flow sensor 32 to produce a voltage output proportional to $W_f/P_{s3}[f(P_{s3})]$.

The output from the rotor speed sensor 26 is fed to a second function generator 36, adapted to produce a predetermined voltage output in response to the input from the speed sensor 26. Again, the function generator 36 may take the form of the servo multiplier discussed on p. 132 of the Control Engineering Manual. The shape of the output curve for the function generator 36 may take the form shown in FIGURE 5, line a, which shows that the term $f(N)$ increases with increasing rotor speed (N), thereby compensating for changes in $C_p$, $N_{B4}$ and the flow function coefficient $F_f$.

The output from the dividing device 46 and the function generator 36 are fed to a dividing device 38 which may be a servo multiplier adapted for this purpose as shown on p. 129 of the Control Engineering Manual. The dividing device divides the output of device 46 by the output of device 36.

If the gas turbine engine 10 has a fixed turbine nozzle 20, the inverse value of its area ($A_4$) and the fuel heating value term K may be combined into a single constant for multiplication of the output of device 38 by a multiplier 39, such as one found on p. 129 of the Control Engineering Manual. Should the turbine nozzle 20 be variable, an area signal device 33, shown in phantom, may be used to produce a signal inversely proportional to the area ($A_4$) which is fed the multiplying device 39, biased by the fuel heating value constant (K). Minor variations in fuel heating value between different types of fuel may be compensated by an adjustment of the degree to which the multiplying device 39 is biased.

The output from the multiplying device 39 is fed to a multiplying device 44, later described, and to an adding device 40, wherein the signal reflecting $T_3$ from the temperature sensor 28 is added to the signal from the dividing device 38 to produce an output proportional to $T_4$. The adding device may take the form of a pair of parallel connected resistors, as shown on p. 126 of the Control Engineering Manual.

At this point it should be noted that the final equation, No. 6, for expressing $T_4$ includes, as an independent variable, the square root of $T_4$. The mathematical difficulty presented by this equation is resolved by an important feature of the invention, namely, mechanization of this function by feeding the $T_4$ output to a square root device 42. The square root device 42 may take the form of a servo multiplier adapted for this purpose, as shown on p. 132 of the Control Engineering Manual.

The output from the square root device 42 is fed to an electrical time lag device 43. The electrical time lag device 43, which may be one of numerous devices well known to those skilled in the art, causes the signal from the square root device to have a predetermined lag to make the feedback loop mathematically determinative.

The output from the time lag device 43 is fed to the multiplying device 44, which may be similar to device 39, for multiplying that output by the output from the multiplying device 39.

By feeding the square root of the output signal reflecting $T_4$ through a time delay feedback loop, the mathematical process of assuming output values of $T_4$ to calculate a $T_4$ until the two values equal one another is eliminated. Thus, a lengthly mathematical process is automatically produced in a very short period of time.

The foregoing temperature indicating system functions to produce an accurate representation of the turbine inlet temperature $T_4$ of a gas turbine engine from signal inputs reflecting easily measured engine operating parameters. The output signal of the temperature indicating system may be used for many purposes, including limiting the area of a variable area exhaust nozzle to control $T_4$, or limiting fuel flow to control $T_4$.

If even greater accuracy is desired from the temperature indicating system, the following alternate embodiments of the various intermediate signal producing systems may be used.

Reference is now had to FIGURE 2 which shows a modification of the intermediate signal producing system shown in FIGURE 1 to mechanize the division of $W_f$ by $P_{s3}$ and compensate the efficiency of combustion ($\eta_{CB}$) as a primary function of ($P_{s3}$) and additionally as a secondary function of the air-fuel ratio.

The air fuel ratio may be substantially represented as a function of the fuel flow and the static pressure near the inlet to the combustor 16 [$f(W_f, P_{s3})$]. The devision of the fuel flow $W_f$ by the pressure $P_{s3}$ may be conveniently incorporated in the [$f(W_f, P_{s3})$] by making the term $f(P_{s3})$ reflect an inverse value of $P_{s3}$.

Thus, the outputs from the pressure sensor 30, and fuel flow sensor 32 are fed to a function generator 50 which produces an output signal having a predetermined relationship to the input variables $W_f$, $P_{s3}$. An example of the relationship which may be empirically determined is shown in FIGURE 6 wherein a family of curves showing the relationship between $W_f$ and $P_{s3}$ is represented. It should be noted that $P_{s3}$ is on the X axis and the term $f(W_f, P_{s3})$ is on the Y axis with each successive curve to the right reflecting increasing fuel flow. The function generating device 50 may take the form of an electrical device or a device which converts the electrical signals to mechanical signals for use with a cam having a contour such that a cam follower would produce the output shown in FIGURE 6. Of course, with the use of the cam, means must be provided to convert the mechanical output signal to an electrical signal compatible with the rest of the temperature indicating system components. Other types of devices for this purpose are discussed on pp. 132–134 of the Control Engineering Manual.

The additional compensation of the combustor efficiency $\eta_{CB}$ by the fuel-air ratio in the intermediate signal producing system provides highly accurate calculated turbine inlet temperatures for steady state operation of the engine.

To provide greater accuracy for transient engine operation, namely acceleration, the term $f(N)$ is made dependent upon the operating mode of the engine 10 and the combustor inlet temperature $T_3$.

The intermediate signal producing system shown in block fashion in FIGURE 3 is utilized to compensate for these effects. The signal output from the speed indicator 26 is fed to a steady state function generator 54, which may be similar to the function generating device 48 for producing a function of speed $f(N)$ shown in the experimentally or empirically derived line c of FIGURE 5. The output of the speed sensing device 26 is also fed to an acceleration function generator 56, which additionally receives an input from the temperature sensor 28. The acceleration function generator may be similar to the function generator 50. The acceleration function generator 56 produces an output that is a predetermined function of the speed and temperature input. A typical functional curve is shown in FIGURE 5, line b, wherein it is shown that the variation of the function of speed $f(N)$ is determined by the level of speed (N) and at lower speed levels additionally by the temperature $T_3$ at the inlet to the combustor 16.

The outputs from the steady state and acceleration function generators 54, 56 are fed to an electrical switching device 58 which selects either of the two output signals, depending upon which operating mode the engine 10 is in, and feeds the selected signal to the dividing device 38, as previously discussed. The electrical switching device 58 may be conveniently actuated by a signal from an off-speed device 60 which compares the actual speed (N) of the engine 10 as produced by sensor 26 (note the connection therebetween) to an electrical signal generated by a speed scheduler 62, normally found in the control systems of most gas turbine engines.

When the scheduled speed signal is greater by a predetermined amount than the actual speed signal, the engine is in the acceleration mode, and the off-speed device 60 generates a signal which actuates the switching device 58 to connect the output from the acceleration function generator 56 to the dividing device 38. When the difference between the scheduled speed signal and the actual speed signal is less than the predetermined amount, the off-speed signal device 60 actuates the switching 58 to direct the output from the steady state function generator 54 to the dividing device 38.

By utilizing the above control configuration in representing the flow function coefficient, the indicated turbine inlet temperature $T_4$ is a highly accurate value, especially over the broad range of engine operating conditions, encompassing idle, acceleration, and steady state operation.

The intermediate signal producing system shown in FIGURE 3 includes a compensation for the combustor inlet temperature $T_3$ on the acceleration mode only, as its effect on the function $f(N)$ in this mode is most significant. However, if the highest degree of accuracy is desired, the relatively minor effects of $T_3$ on the function $f(N)$ in the steady state mode (not shown herein for simplification) may be compensated for by providing an input from the temperature sensor 28 to the steady state function generator 54, and provide a new predetermined output function therefrom. With this configuration, the steady state function generator would be similar to the acceleration function generator 56.

While the foregoing discussion has been directed to specific configurations for the components making up the turbine inlet temperature ($T_4$) indicating system, it should be noted that there are common features of each configuration. The use of primarily one function of rotor speed to express the flow function coefficient and compensate certain parameters used in the derivation of the turbine inlet temperature is highly important and enables a simplified indicating system to provide highly accurate output signals. The particular function of rotor speed $f(N)$ will, of course, vary between engine types. However, it is sufficient to determine empirically the function of speed for one type of engine, and this function will be applicable to individual engines within that type.

Furthermore, the variation of $f(N)$ as functions of the engine operating mode and the combustor inlet temperature $T_3$ enables the computing system to produce highly accurate values of $T_4$ over a broad range of operating conditions.

Another feature of the invention is the unique mechanization of the square root of the turbine inlet temperature ($T_4$) in the temperature indicating system. The feedback loop of the square root of this turbine inlet temperature ($T_4$) provides a highly effective way of producing the indicated $T_4$ without resorting to a complex system in which assumed values of $T_4$ are selected to compute values of $T_4$ until the assumed and computed values are equal.

It is to be understood that many combinations of the particular system configurations described above may be selected by one skilled in the art to indicate the turbine inlet temperature ($T_4$) of a gas turbine engine without departing from the spirit of the invention. The scope of the invention, therefore, is to be determined solely by the appended claims.

Having thus described the invention, what is claimed as novel and desired to be secured by Letters Patent of the United States is:

1. In a gas turbine engine comprising,
a compressor for pressurizing air, said compressor having a compressor rotor,
a combustor to which the pressurized air is delivered to support combustion therein,
means for delivering fuel to said combustor for combustion with said air to generate a hot gas stream,
a turbine comprising a rotor and an inlet for directing the hot gas stream to drive said rotor,
the rotors of said compressor and turbine being connected to from an engine rotor,
means for indicating the temperature at the inlet of said turbine, said indicating means comprising,
means for producing signal respectively proportional to engine rotor speed, combustor inlet air temperature, combustor inlet static pressure, and rate of fuel flow to the combustor,
means receiving the output from said signal producing means for generating an intermediate signal as a function of the fuel flow divided by the turbine inlet area and the combustor inlet static pressure and as a predetermined function of engine rotor speed and of the combustor inlet static pressure,
means for adding the output signal from said temperature signal means to the output of said intermediate signal generating means,
means for deriving from the output signal of said adding means a signal representative of the square root thereof and multiplying the output from said intermediate signal generating means by said square root signal,
whereby said indicating means produces an output signal from the adding means accurately representing the temperature at the inlet to said turbine.

2. Apparatus as in claim 1 wherein,
said means for producing said square root signal further comprises,
means for producing a time lag of the output signal therefrom.

3. Apparatus as in claim 1 wherein,
said intermediate signal generating means is adapted to generate an output signal as an additional predetermined function of fuel flow such that the output signal is compensated for the combustor efficiency by a predetermined function of fuel flow and the combustor inlet static pressure.

4. Apparatus as in claim 1 wherein,
said intermediate signal generating means is adapted to produce one signal during steady state operation of said engine and another signal for acceleration of said engines,
said steady state signal reflecting one predetermined function of rotor speed and said acceleration signal reflecting another predetermined function of rotor speed,
whereby the signal from said indicating means accurately represents the turbine inlet temperatures over a broad range of engine operating conditions.

5. Apparatus as in claim 4 wherein,
said intermediate signal generating means is adapted to normally produce said steady state signal, and
said indicating means further comprises means for actuating said intermediate signal generating means to produce said acceleration signal when said engine is operating in an acceleration mode.

6. Apparatus as in claim 5 wherein,
said intermediate signal producing means is adapted to produce a signal during acceleration of said engine which reflects said predetermined function of rotor speed and a predetermined function of combustor inlet temperature,
whereby said indicating means produces an output signal accurately representing the turbine inlet temperature over a broad range of engine operating conditions.

7. Apparatus as in claim 6 wherein,
said intermediate signal producing means is adapted to produce a signal during steady state operation of said engine which reflects said predetermined function of rotor speed and a predetermined function of combustor inlet temperature,
whereby said indicating means produces an output signal accurately representing the turbine inlet temperature during substantially all engine operating conditions.

8. Apparatus as in claim 5 wherein,
said actuating means is responsive to changes in engine rotor speed above a predetermined level for actuation of said intermediate signal producing means to produce said acceleration signal.

9. Apparatus as in claim 1 wherein,
said engine has a variable area inlet for said turbine, and
said indicating means further comprises,
means for producing a signal proportional to the area of said turbine inlet.

References Cited

UNITED STATES PATENTS

| | | | |
|---|---|---|---|
| 2,809,492 | 10/1957 | Arkawy | 60—39.28 |
| 2,836,976 | 6/1958 | Traupel | 73—346 |
| 3,025,670 | 3/1962 | Russ | 60—39.28 |
| 3,187,504 | 6/1965 | Herbert et al. | 60—39.28 XR |

JULIUS E. WEST, *Primary Examiner.*